(12) United States Patent
Anderson et al.

(10) Patent No.: US 8,592,069 B1
(45) Date of Patent: Nov. 26, 2013

(54) BATTERY SECUREMENT SYSTEMS AND APPARATUS

(71) Applicant: GM Global Technology Operations LLC, Detroit, MI (US)

(72) Inventors: Alastair Gordon Anderson, Wiesbaden (DE); Ralf Lerch, Armsheim (DE); Stefan Toepfer, Mainz-Kostheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/652,134

(22) Filed: Oct. 15, 2012

(51) Int. Cl.
*H01M 2/10* (2006.01)

(52) U.S. Cl.
USPC .............................. 429/100; 429/97; 429/99

(58) Field of Classification Search
None
See application file for complete search history.

(56) References Cited

U.S. PATENT DOCUMENTS

| | | | | |
|---|---|---|---|---|
| 5,208,526 A | * | 5/1993 | Goldman et al. | 320/128 |
| 5,378,555 A | * | 1/1995 | Waters et al. | 429/97 |
| 6,340,538 B1 | * | 1/2002 | King | 429/96 |
| 2003/0047366 A1 | * | 3/2003 | Andrew et al. | 180/68.5 |

* cited by examiner

*Primary Examiner* — Patrick Ryan
*Assistant Examiner* — Jose Colucci Rios
(74) *Attorney, Agent, or Firm* — Phillips Ryther & Winchester; Matthew D. Thayne (57) ABSTRACT

Systems and apparatus for securing a battery within a vehicle, such as a battery for an electric vehicle. In some embodiments, a vehicle battery system may be provided that comprises a battery frame for housing a vehicle battery. A tray may be provided that is configured for receiving the battery frame housing the vehicle battery. One or more securement members may be coupled with the tray and configured to engage an upper surface of a portion, such as a foot section, of the battery. The securement member(s) may be configured to engage the battery so as to at least substantially prevent the battery from moving relative to the tray. The securement member may thereby accommodate batteries of different sizes to allow for decreased tolerance requirements.

20 Claims, 9 Drawing Sheets

BATTERY SECUREMENT SYSTEMS AND APPARATUS

TECHNICAL FIELD

This disclosure relates to apparatus and systems for securement of vehicle batteries. More specifically, but not exclusively, this disclosure relates to apparatus and systems for securement of batteries for electric vehicles, such as rechargeable energy storage systems for extended-range electric vehicles.

BACKGROUND

Many current battery systems for electric vehicles, such as rechargeable energy storage systems (RESS) for extended-range electric vehicles (EREV), use brackets to secure the battery within the vehicle. Such brackets often require very tight tolerances for the battery and/or battery frame in order to fit properly. As such, these systems are sometimes used in conjunction with rubber sheets to compensate for tolerance requirements that may be difficult to meet. Without such sheets (and, in some cases, even with the use of such sheets), vehicle battery systems may be vulnerable to damage associated with shifting of the battery within the vehicle, such as collisions with the walls defining a tray within the vehicle for receiving the battery. In addition, such brackets are often less than ideal from an ease-of-use standpoint. Indeed, they often require complicated movements or other actions in order to complete a process of securing the battery within the vehicle.

The present inventors have therefore determined that it would be desirable to provide systems and apparatus for securement of vehicle batteries that overcome one or more of the foregoing limitations and/or other limitations of prior art battery securement systems.

SUMMARY

Systems and apparatus are disclosed herein for securing a battery within a vehicle, such as a battery for an electric vehicle. In some embodiments, a vehicle battery system may be provided that comprises a battery frame for housing a vehicle battery. A recessed tray may be provided that is configured for receiving the battery frame housing the vehicle battery.

A securement member may be coupled with the recessed tray and configured to engage an upper surface of a foot section of a first battery frame. The foot section of the first battery frame may have a first height, and the securement member may be configured to directly engage the upper surface of the foot section of the first battery frame so as to at least substantially prevent the battery frame from moving relative to the recessed tray. The securement member may also be configured to directly engage an upper surface of a foot section of a second battery frame so as to at least substantially prevent the battery frame from moving relative to the recessed tray, wherein the foot section of the second battery frame has a second height that differs from the first height. The securement member may thus accommodate battery frames of different sizes.

In some embodiments, the recessed tray may comprise at least one rib that is configured to be aligned with a corresponding slot in the battery frame to facilitate placement of the battery frame in a particular configuration within the tray. Other embodiments may comprise multiple such ribs.

In some embodiments, the securement member may comprise a knurled surface to at least substantially prevent the battery frame from moving relative to the recessed tray. Such a surface may create sufficient friction with the battery frame to at least substantially prevent such movement. In some embodiments, the knurled surface may comprise one or more penetrating members configured to penetrate into the battery frame, such as, for example, into the foot section of the battery frame. One or more of the penetrating members may be configured to penetrate into the foot section of a first battery frame to a first depth and to penetrate into the foot section of a second battery frame to a second depth, wherein the first depth differs from the second depth. In this manner, the penetrating member(s) may facilitate batteries, battery frames, and/or trays of different sizes such that tolerances of such batteries/battery frames/trays need not be as tight.

In some embodiments, one or more of the penetrating members may comprise an elongated rib. The elongated rib(s) may comprise an at least substantially triangular cross-sectional shape and may include a pointed or sharpened tip in order to facilitate penetration of the elongated rib(s) into a portion of a battery frame, such as into a foot section of a battery frame. In embodiments comprising a plurality of elongated ribs, such ribs may be positioned in an at least substantially parallel manner on the securement member. The plurality of elongated ribs may also be positioned to extend at least substantially parallel to a direction from which a securement member extends from a tray. Alternatively, the plurality of elongated ribs may be positioned to extend at least substantially perpendicular to a direction from which the securement member extends from the tray.

In embodiments in which the battery frame comprises opposing first and second foot sections extending laterally from a lower portion of the battery frame, both of the opposing foot sections may comprise an upper surface that may be coupled with a securement member to secure the battery frame to a tray within the vehicle. The tray may comprise a recess defined by opposing sidewalls. The tray may also be configured such that the first and second foot sections of the battery frame sit within the recess when the battery frame is received in the tray. One or more securement members may be coupled with the tray and, as discussed above, one or more of the securement members may comprise a knurled clamping surface that is configured to engage an upper surface of the first foot section. The knurled clamping surfaces of the first and second securement members may be configured to at least substantially prevent the battery frame from being moved vertically within the tray and to provide a frictional impediment to the battery frame being moved in a first horizontal direction within the tray. In some embodiments, the knurled clamping surfaces may provide a frictional impediment to the battery frame being moved in a second horizontal direction within the tray, wherein the second horizontal direction is perpendicular to the first horizontal direction, and, in some such embodiments, the knurled clamping surfaces may provide a frictional impediment to the battery frame being moved in any direction relative to the battery and/or battery frame.

In some embodiments, the knurled clamping surfaces of the first and/or second securement members may comprise at least one penetrating member that is configured to penetrate the first and second foot sections to at least substantially prevent the battery frame from being moved vertically within the tray.

In certain embodiments, one or more fasteners may be provided for coupling the securement member(s) with the tray. Such fasteners may comprise one or more of a bolt, a rivet, a screw, a pin, and a hinge. In some embodiments, one or more of the fasteners may allow the first and second securement members to pivot with respect to the tray.

In some embodiments, the tray may comprise one or more ribs that are configured to be aligned with a corresponding slot in the battery frame to facilitate placement of the battery frame in a particular configuration within the tray.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of systems and methods consistent with various embodiments of the present disclosure is provided below. While several embodiments are described, it should be understood that disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure will be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Embodiments of the systems and apparatus disclosed herein may be used to secure a battery, such as a battery within a vehicle, such as a battery for an electric vehicle. Some embodiments disclosed herein may be particularly useful for securing a rechargeable energy storage system (RESS) within an extended-range electric vehicle (EREV).

Figure 1:
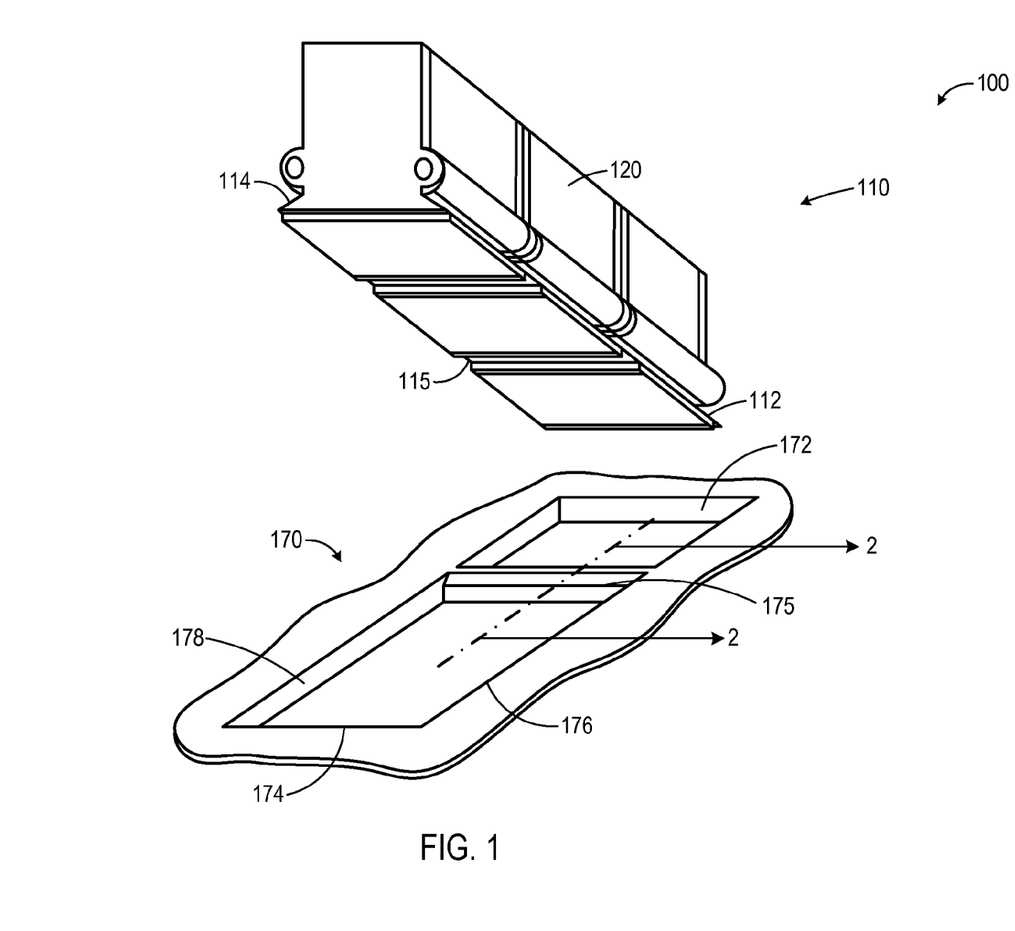
FIG. 1 illustrates a perspective view of one embodiment of a battery securement system.

FIG. 1 depicts a perspective view of one embodiment of a battery securement system 100. Battery securement system 100 comprises a battery 110 and a recessed tray 170 for receiving battery 110. Battery 110 comprises a battery frame 120 that houses one or more sections of a vehicle battery (not shown in FIG. 1). Battery frame 120 comprises foot section 112 and opposing foot section 114.

Tray 170 comprises a rib 175 that is configured to be aligned with a corresponding slot 115 in the battery frame 110 to facilitate placement of the battery frame 110 in a particular configuration within the tray 170. In other embodiments, multiple ribs may be provided, each of which may be configured to be positioned within a corresponding slot in the battery frame.

A securement member (not shown in FIG. 1) may be coupled with the recessed tray and configured to engage an upper surface of a foot section of a first battery frame, as described in greater detail below in connection with other figures.

Figure 2:
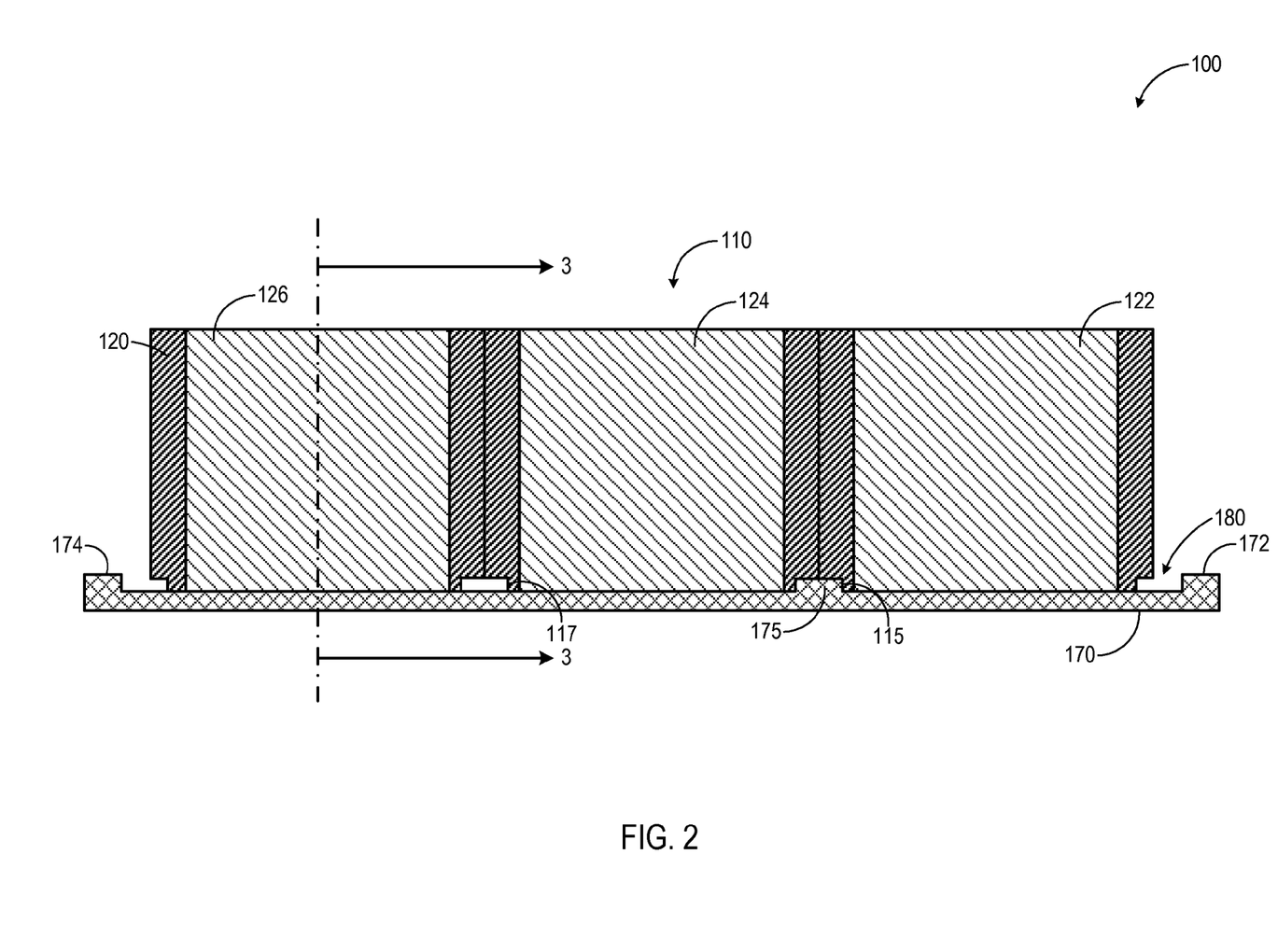
FIG. 2 illustrates a cross-sectional view taken along line 2-2 in FIG. 1.

FIG. 2 illustrates a cross-sectional view of battery securement system 100 taken along line 2-2 in FIG. 1. As shown in this figure, tray 170 comprises opposing sidewalls 172 and 174 that define a recess 180. Recess 180 may be divided, in some embodiments, by one or more ribs, such as rib 175. As shown in FIG. 1, tray 170 may also comprise two additional sidewalls 176 and 178 such that recess 180 is defined in a circumference.

FIG. 2 also illustrates that battery 110 comprises three battery sections, sections 122, 124, and 126. These battery sections are enclosed within battery frame 120. Battery frame 120 also comprises two separate slots 115 and 117. Slot 115 is configured to receive rib 175 and slot 117 may be configured to receive another rib formed within the tray 170. However, in the embodiment depicted in FIG. 2, only slot 115 is engaged with a rib. Slot 117 is not engaged with a corresponding rib. Various alternatives will be apparent to one of ordinary skill in the art, including but not limited to embodiments lacking slots/ribs, embodiments including more slots/ribs, and embodiments having slots/ribs of various different sizes, shapes, and locations.

Figure 3:
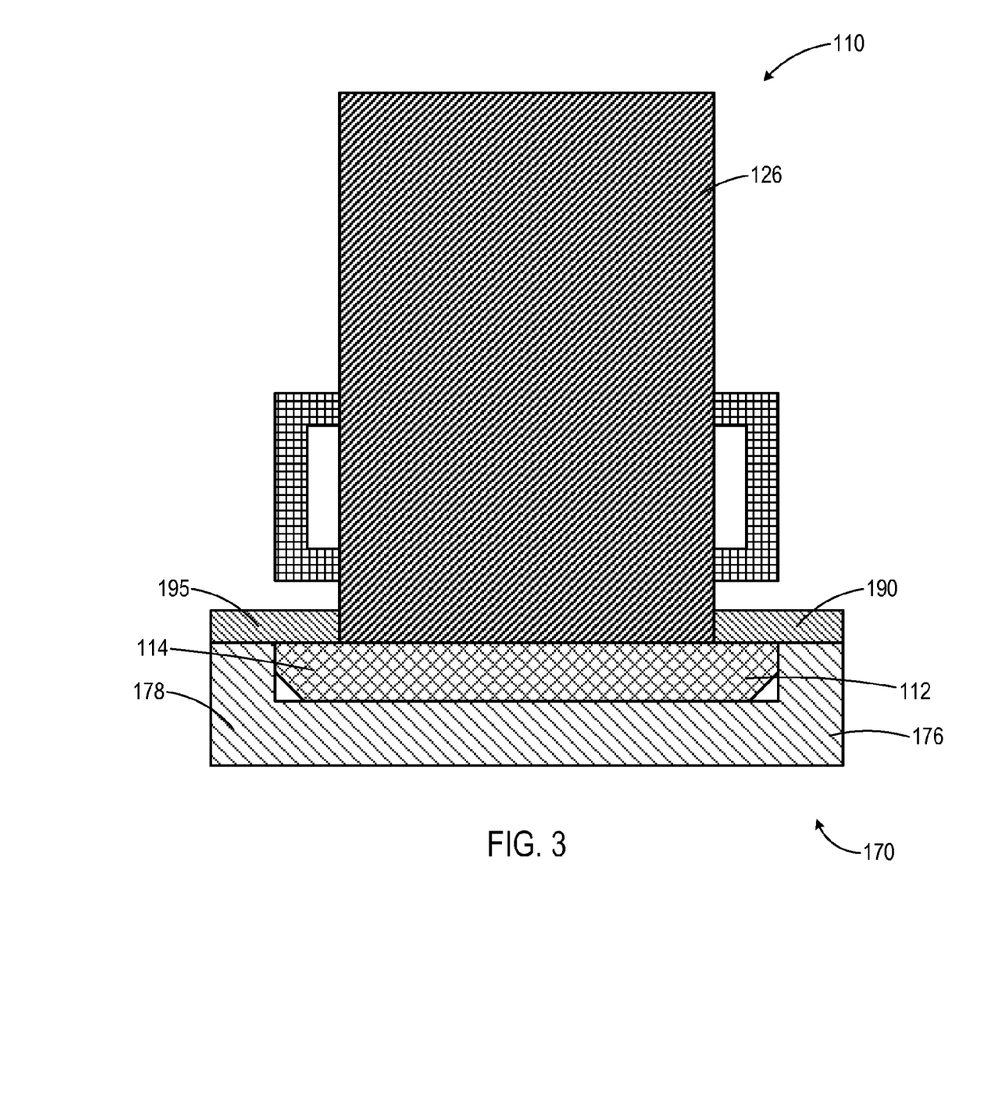
FIG. 3 illustrates a cross-sectional view taken along line 3-3 in FIG. 2.

FIG. 3 illustrates a cross-sectional view taken along line 3-3 in FIG. 2. As illustrated in this figure, tray 170 comprises two securement members, securement member 190 and securement member 195. Securement member 190 is configured to engage the upper surface of foot section 112 of battery frame 120. The engagement between securement member 190 and foot section 112 may be such that battery 110 is prevented, or at least substantially prevented, from moving relative to recessed tray 170. Similarly, securement member 195 is configured to engage the upper surface of foot section 114 of battery frame 120. The engagement between securement member 195 and foot section 114 may also be such that battery 110 is prevented, or at least substantially prevented, from moving relative to recessed tray 170.

Figure 4:
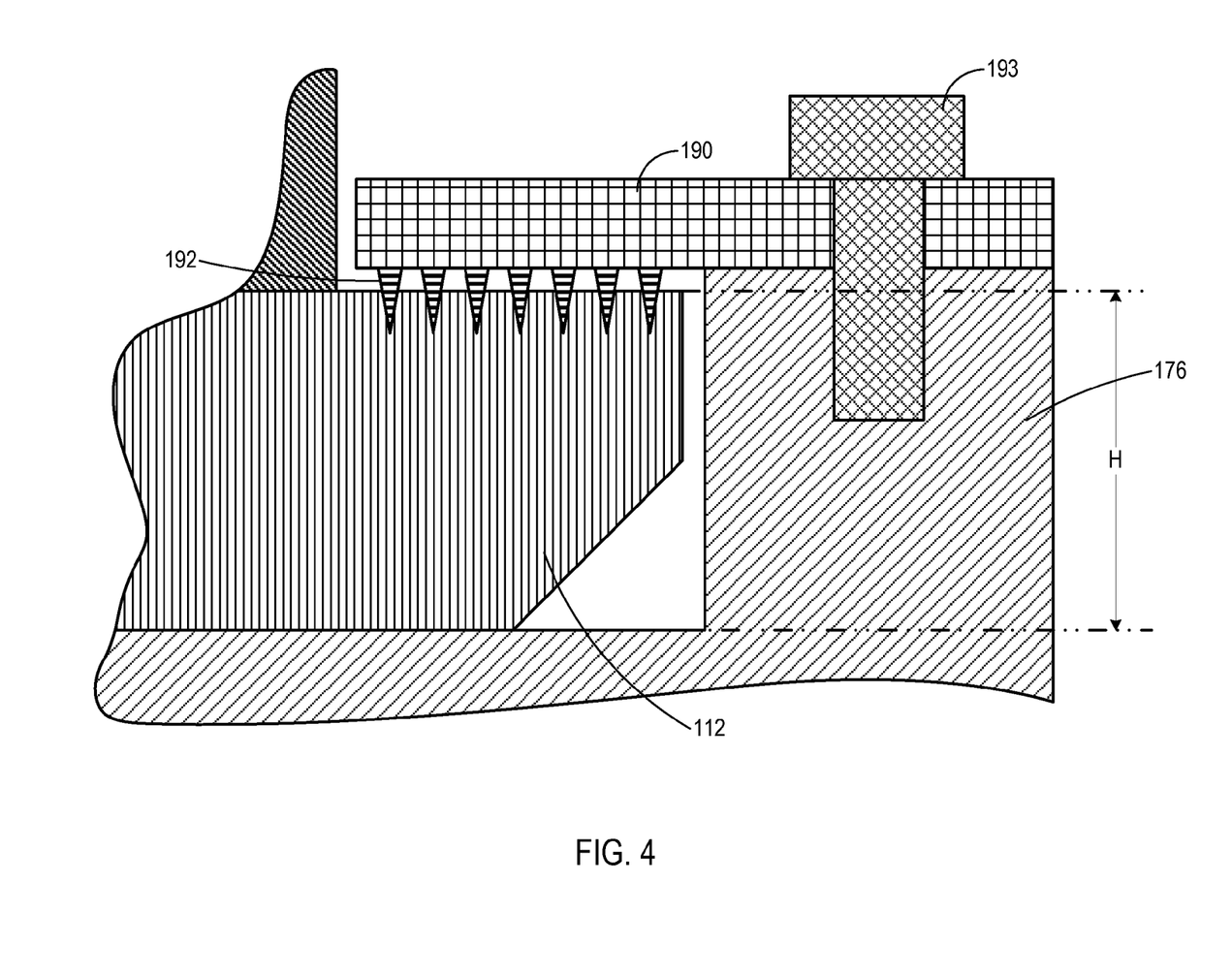
FIG. 4 illustrates a close-up, cross-sectional view of the interface between an embodiment of a foot section of a battery frame and an embodiment of a securement member of a battery tray.

FIG. 4 illustrates a close-up, cross-sectional view of the interface between foot section 112 and securement member 190. As illustrated in this figure, securement member 190 includes a knurled surface comprising a plurality of penetrating members 192. The knurled surface of securement member 190 is configured to create sufficient friction with battery 110 to at least substantially prevent movement between battery 110 and tray 170. More particularly, in the depicted embodiment, penetrating members 192 are configured to penetrate into foot section 112 of battery frame 120.

Penetrating members 192 may be integrally formed with the securement member 190 or, alternatively, penetrating members 192 may be made out of a different material than securement member 190 and may be attached to securement member 190. In embodiments in which penetrating members 192 are attached to securement member 190, such attachment may be by way of, for example, an adhesive, screws, bolts, rivets, pins, etc.

Penetrating members 192 may be configured to penetrate into a foot section of a first battery frame to a first depth and to penetrate into a foot section of a second battery frame to a second depth, wherein the first depth differs from the second depth. In this manner, the penetrating member(s) may facilitate batteries and/or battery frames of different sizes such that tolerances of such batteries/battery frames need not be as tight.

Figure 5:
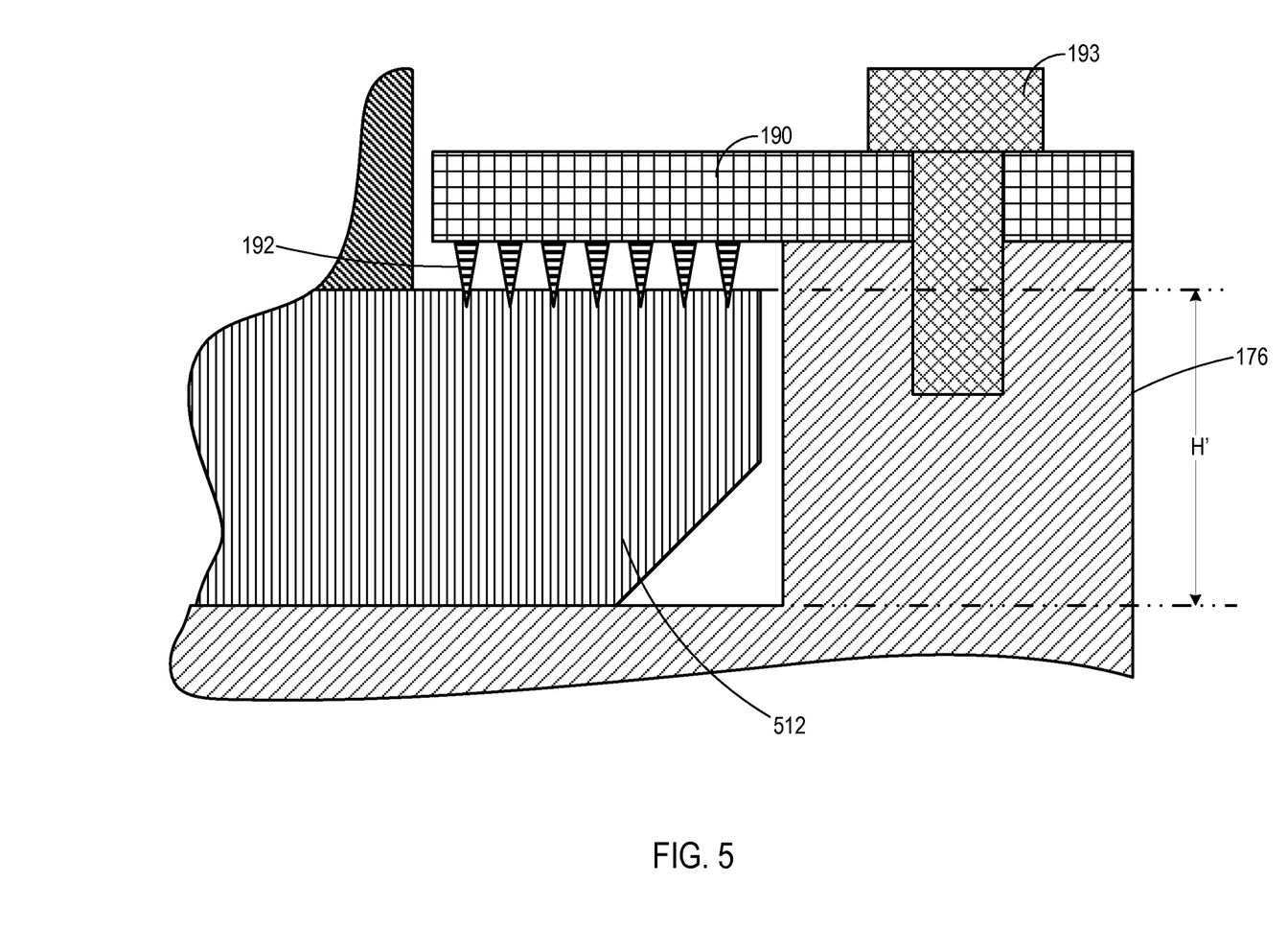
FIG. 5 illustrates a close-up, cross-sectional view of the interface between an alternative embodiment of a foot section of a battery frame and the securement member of FIG. 4, wherein the foot section has a lesser height than that of the foot section of the embodiment depicted in FIG. 4.

For example, FIG. 5 illustrates a close-up, cross-sectional view of the interface between a foot section 512 of an alternative battery frame and the securement member 190 depicted in FIG. 4. Foot section 512 has a lesser height (H') than the height (H) of the foot section 112 of the embodiment depicted in FIG. 4. As such, penetrating members 192 penetrate into foot section 112 to a greater depth than penetrating members 192 penetrate into foot section 512. With respect to either of the two foot sections depicted in FIGS. 4 and 5, however, the penetrating members 192 are configured to create sufficient friction with the battery to at least substantially prevent movement between the battery and the tray. The foot section(s) may be made up of any material that is sufficiently pliable and/or deformable to allow for a tight friction fit and/or allow for sufficient penetration to affix the battery in place, such as a variety of plastics, rubber, and the like.

The knurled clamping surface(s) of the one or more securement members may be configured to penetrate the first and second foot sections to at least substantially prevent the battery frame from being moved vertically within the tray. In some embodiments, the knurled clamping surface(s) may be configured to at least substantially prevent the battery frame from being moved vertically within the tray and to provide a frictional impediment to the battery frame being moved in a first horizontal direction within the tray. In some embodiments, the knurled clamping surface(s) may provide a frictional impediment to the battery frame being moved in a second horizontal direction within the tray, wherein the second horizontal direction is perpendicular to the first horizontal direction, and, in some such embodiments, the knurled clamping surface(s) may provide a frictional impediment to the battery frame being moved in any direction relative to the battery and/or battery frame.

It should be understood that, in some embodiments, a single securement member may be sufficient to at least substantially prevent movement by the battery relative to the tray. Other embodiments may comprise more than two securement members. Similarly, some embodiments may comprise a single penetrating member positioned along each securement member. Other embodiments may comprise multiple securement members.

In some embodiments, one or more of the penetrating members may comprise an elongated rib. The elongated rib(s) may comprise an at least substantially triangular cross-sectional shape, as illustrated in the embodiment of FIG. 5, and may include a pointed or sharpened tip in order to facilitate penetration of the elongated rib(s) into a portion of a battery frame, such as into a foot section of a battery frame. In embodiments comprising a plurality of elongated ribs, such ribs may be positioned in an at least substantially parallel manner on the securement member, which is also consistent with the embodiment depicted in FIG. 5.

In such embodiments, the plurality of elongated ribs may also be positioned to extend at least substantially parallel to a direction from which a securement member extends from a tray, as illustrated in FIG. 5. In other embodiments, the plurality of elongated ribs may be positioned to extend at least substantially perpendicular to a direction from which the securement member extends from the tray. In still other embodiments, the ribs may be positioned in a "checkerboard" pattern or otherwise positions to extend both substantially perpendicular and substantially parallel to a direction from which a securement member extends from a tray.

In still other embodiments, one or more of the penetrating members may comprise spikes rather than elongated ribs. In some embodiments, such spikes may comprise an at least substantially conical shape and may, like the ribs discussed above, terminate in a pointed or sharpened tip in order to facilitate penetration of the spike(s) into a portion of a battery frame, such as into a foot section of a battery frame.

As illustrated in FIGS. 4 and 5, one or more of the securement members may be coupled with the tray via one or more fasteners. For example, FIGS. 4 and 5 depict a fastener 193 that extends through securement member 190 and into a sidewall 176 of tray 170. Such fasteners may comprise, for example, a bolt, a rivet, a screw, a pin, and/or a hinge. In some embodiments, one or more of the fasteners may allow the first and second securement members to pivot with respect to the tray to facilitate placement of the battery within the tray.

Figure 6:
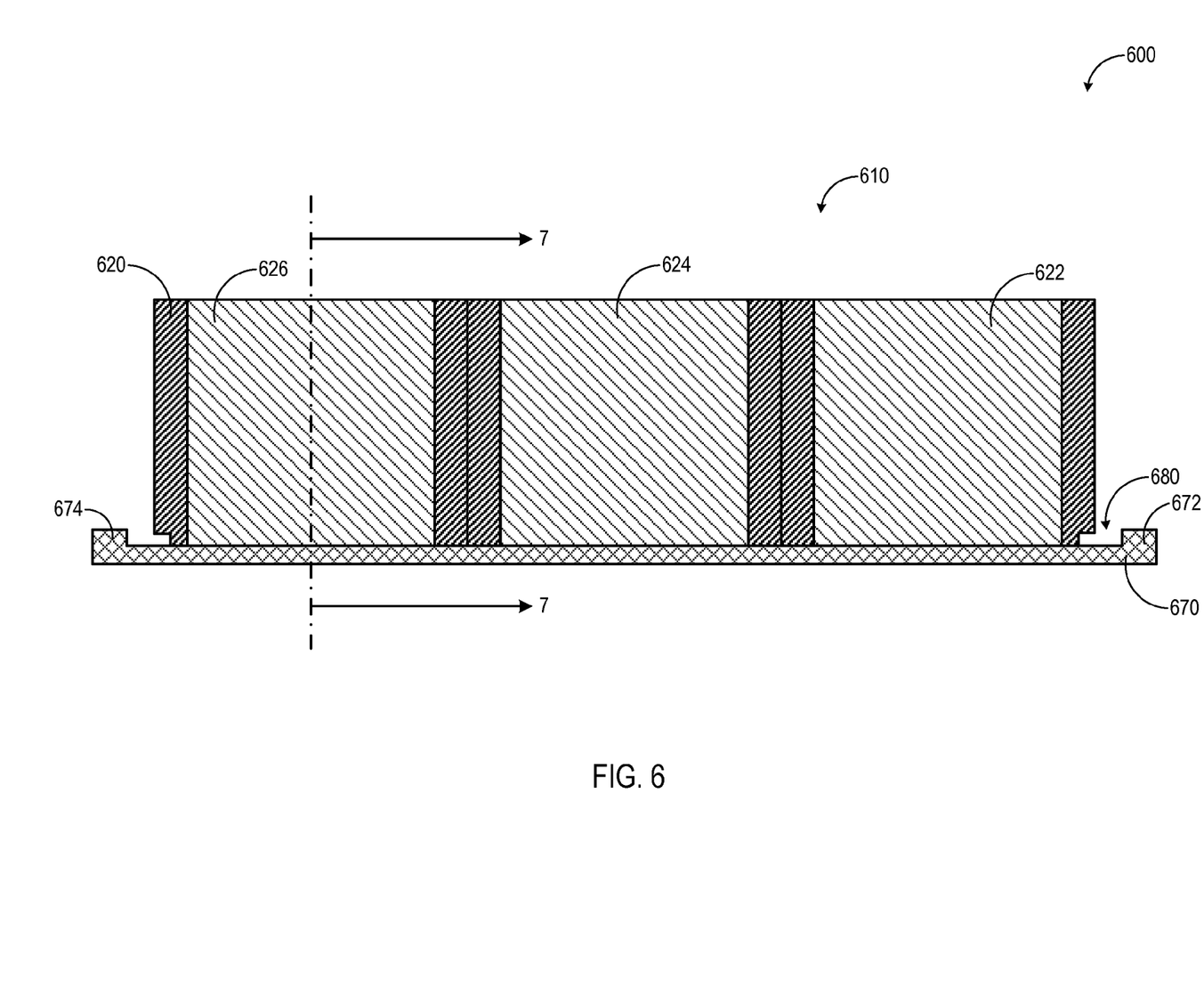
FIG. 6 illustrates a cross-sectional view of an alternative embodiment of a battery securement system.
Figure 7:
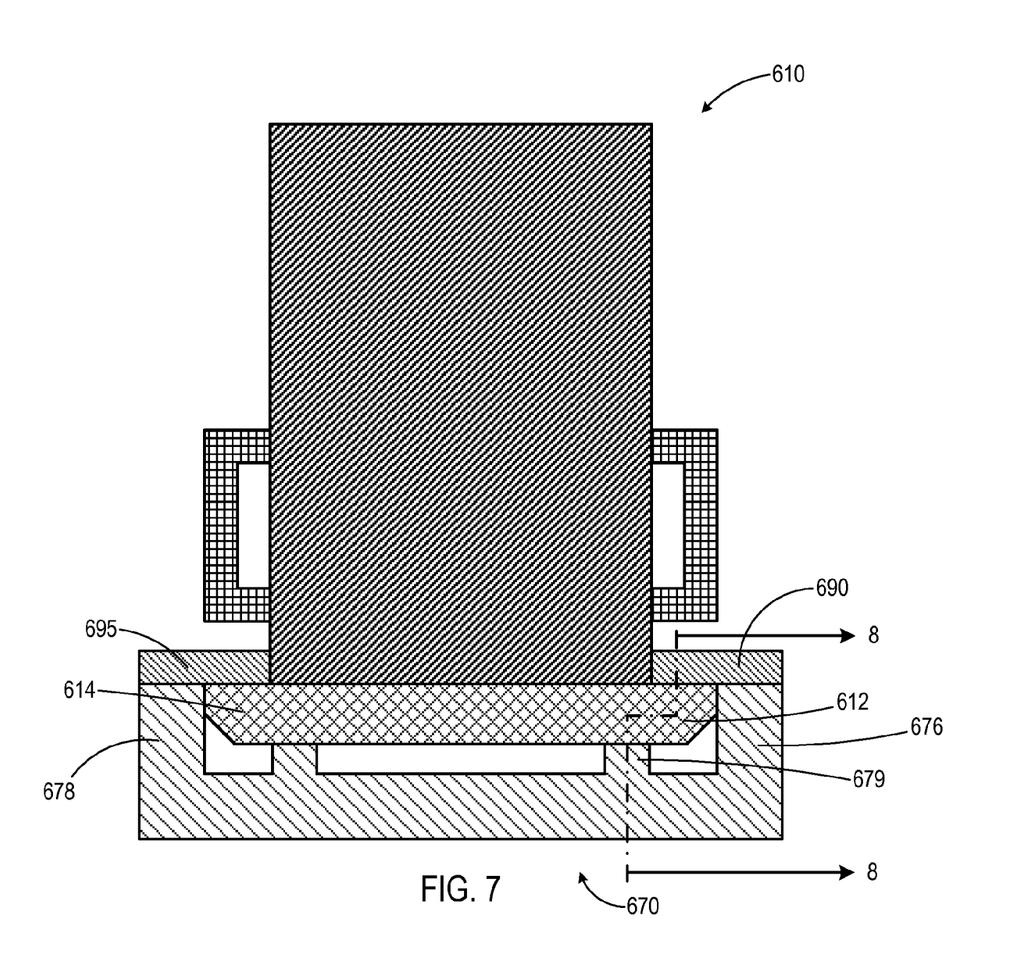
FIG. 7 illustrates a cross-sectional view taken along line 7-7 in FIG. 6.

FIG. 6 illustrates a cross-sectional view of an alternative embodiment of a battery securement system 600. As with battery securement system 100, tray 670 comprises opposing sidewalls 672 and 674 that define a recess 680. Unlike battery securement system 100, battery securement system 600 does not include a rib to divide tray 670 into sections and to facilitate locating battery 610 in a desired location and position in tray 670. As such, battery securement system 600 is configured such that battery 610 does not need to be placed in a specific location or direction within tray 670. As shown in FIG. 7, tray 670 may also comprise two additional sidewalls 676 and 678 such that recess 680 is defined in a circumference.

FIG. 6 also illustrates that battery 610 comprises three battery sections, sections 622, 624, and 626. These battery sections are enclosed within battery frame 620. Unlike the embodiment depicted in FIG. 2, the embodiment of FIG. 6 does not include any slots for engagement with ribs formed within the tray. However, tray 670 includes two raised platform sections 679, as depicted in FIG. 7. Platform sections 679 may, in some embodiments, comprise a different material or materials than the rest of tray 670. For example, platform sections 679 may comprise a more resilient material to provide a cushioning effect to battery 610.

As also illustrated in FIG. 7, tray 670 comprises two securement members, securement member 690 and securement member 695. Securement member 690 is configured to engage the upper surface of foot section 612 of battery frame 620. The engagement between securement member 690 and foot section 612 may be such that battery 610 is prevented, or at least substantially prevented, from moving relative to recessed tray 670. Similarly, securement member 695 is configured to engage the upper surface of foot section 614 of battery frame 620. The engagement between securement member 695 and foot section 614 may also be such that battery 610 is prevented, or at least substantially prevented, from moving relative to recessed tray 670.

Figure 8:
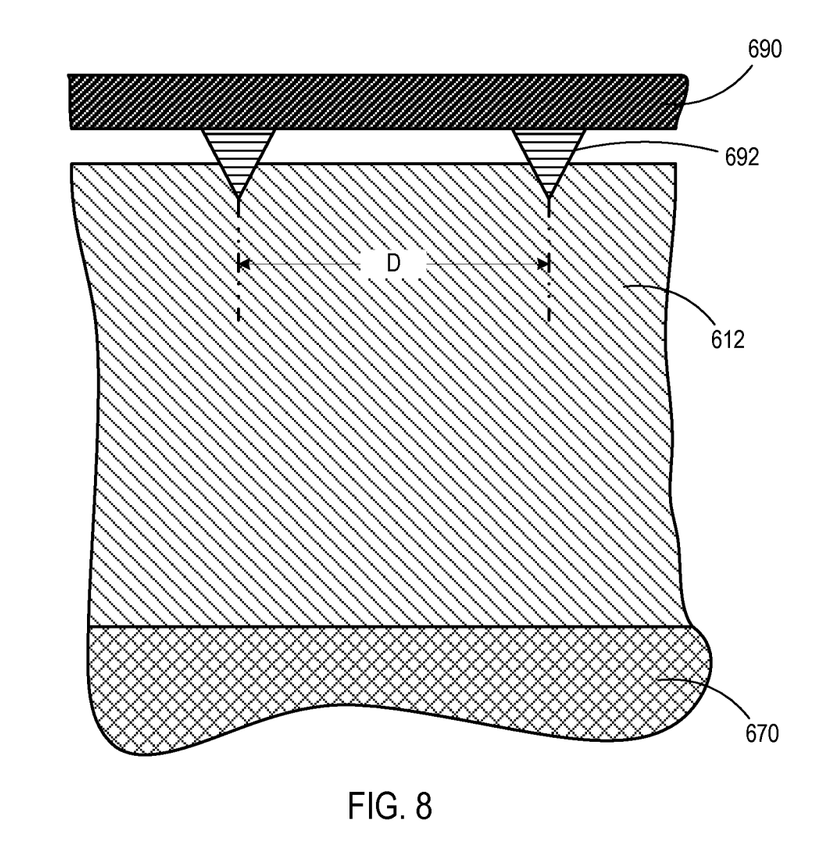
FIG. 8 illustrates a cross-sectional view taken along line 8-8 in FIG. 7.

FIG. 8 illustrates a cross-sectional view taken along line 8-8 in FIG. 7. FIG. 8 also depicts penetrating members 692 after they have penetrated foot section 612 of battery frame 620. As also illustrated in FIG. 8, adjacent penetrating members 692 are separated by a distance "D." For some embodiments and/or materials, if distance D is too small, there may be too many penetrating members on a single securement member, and thus the force required to push all the penetrating members into the frame may be too high and the ribs may not protrude into the plastic far enough. If, on the other hand, the distance is too large, the acceleration force from the mass of the battery in a crash situation may be distributed over too few penetrating members, which may cause them to fail prematurely. In some embodiments, it has therefore been discovered that making distance D in the range of about 10 mm to about 40 mm may be desirable. In some such embodiments, distance D may be in the range of about 20 mm to about 30 mm.

Figure 9:
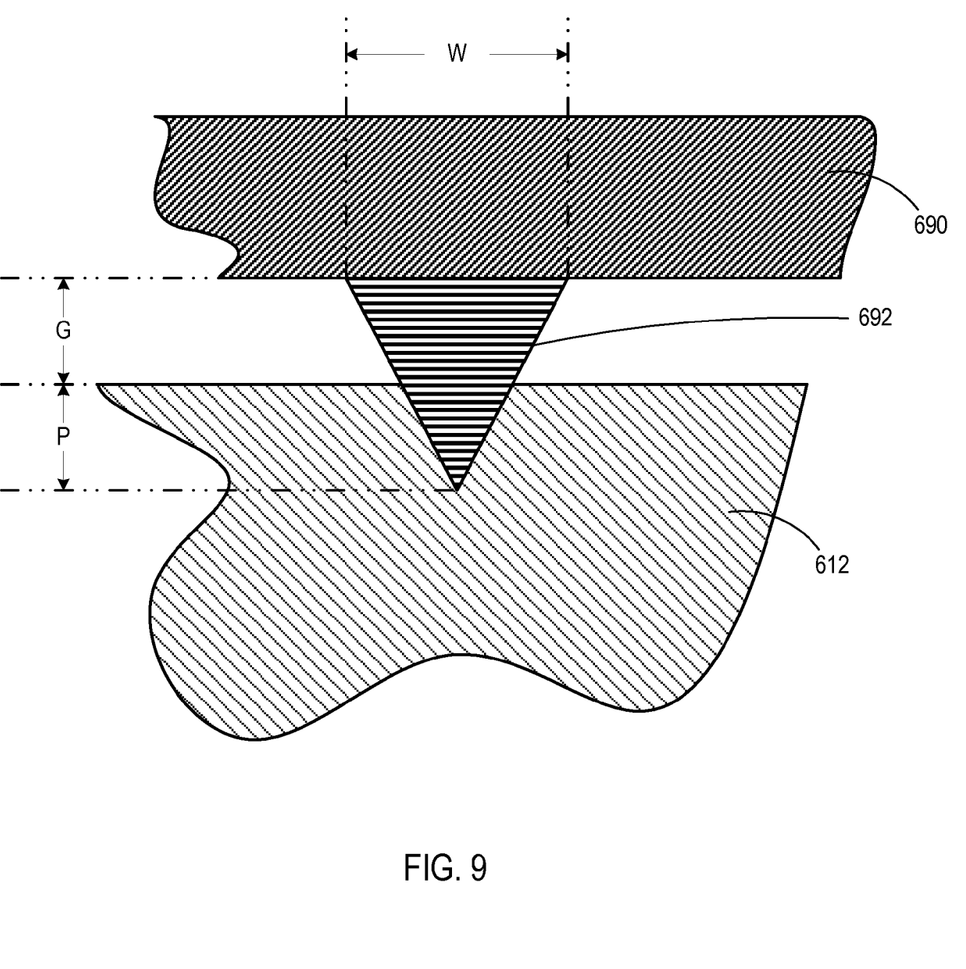
FIG. 9 illustrates a close-up view of the interface between a penetrating member of a securement member and a foot section of a battery frame.

FIG. 9 illustrates a close-up view of the interface between penetrating member 692 and foot section 612. As shown in this figure, penetrating member 692 penetrates into foot section 612 to a penetrating depth "P." As also shown in this figure, securement member 690 is separated from foot section 612 by a gap distance "G." As should be apparent, as the height of foot section 612 increases, gap distance G will decrease. Similarly, penetrating member 692 will be forced to a greater penetrating depth P as the height of foot section 612 increases. In this manner, batteries having different dimensions resulting from manufacturing tolerances may be accommodated without sacrificing the security of the battery within the tray.

The manufacturing tolerances of some embodiments of battery securement systems may be designed such that the maximum gap between the battery (e.g., foot section) and the tray (e.g., securement member) is substantially identical to the minimum depth of penetration of the penetrating member(s) within the battery. In other words, with reference to FIG. 9, the maximum penetrating depth P may be substantially identical to the gap distance G. This design may provide a desirable combination of: (1) suitably high friction to prevent or at least substantially prevent movement between the battery and the tray; and (2) suitably low forces on the penetrating member(s) so as to prevent them from being broken off from the securement member(s).

For example, in some embodiments, the manufacturing tolerances may be designed such that the maximum gap G between the battery (e.g., foot section) and the tray (e.g., securement member) is about 1.0 mm. In such an embodiment, such a design may ensure that all batteries will be penetrated to a penetrating depth P of at least 1.0 mm. Thus, in such embodiments, the penetrating members may have a length of about 2.0 mm.

As also illustrated in FIG. 9, penetrating member 692 has a width "W" at its base. The dimension of this width may be important, depending upon the materials and other parameters used in the system. For example, if the width W is too small, the penetrating member may be too weak and may be prone to breakage at the root. If, on the other hand, the width W is too large, the penetrating member may become very difficult to push into the frame, such as into the frame foot, with a reasonable amount of force. As such, in some embodiments, width W may be between about 1.0 mm and about 2.0 mm. In some such embodiments, width W may be between about 1.5 mm and about 1.7 mm.

The foregoing specification has been described with reference to various embodiments. However, one of ordinary skill in the art will appreciate that various modifications and changes can be made without departing from the scope of the present disclosure. For example, various operational steps, as well as components for carrying out operational steps, may be implemented in alternate ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. A vehicle battery system, comprising:
   a battery frame housing a vehicle battery, wherein the battery frame comprises opposing first and second foot sections extending laterally from a lower portion of the battery frame, and wherein the first and second foot sections each comprise an upper surface;
   a tray for receiving the battery frame, wherein the tray comprises a recess defined by opposing sidewalls, and wherein the tray is configured such that the first and second foot sections sit within the recess when the battery frame is received in the tray;
   a first securement member coupled with the tray, wherein the first securement member comprises a knurled clamping surface that is configured to engage an upper surface of the first foot section; and
   a second securement member coupled with the tray, wherein the second securement member comprises a knurled clamping surface that is configured to engage an upper surface of the second foot section, wherein the knurled clamping surfaces of the first and second securement members are configured to at least substantially prevent the battery frame from being moved vertically within the tray and to provide a frictional impediment to the battery frame being moved in a first horizontal direction within the tray.

2. The system of claim 1, wherein the knurled clamping surfaces of the first and second securement members are configured to provide a frictional impediment to the battery frame being moved in a second horizontal direction within the tray, wherein the second horizontal direction is perpendicular to the first horizontal direction.

3. The system of claim 1, wherein the first and second securement members are configured to accommodate receipt of foot sections of varying heights while still at least substantially preventing the battery frame from being moved vertically within the tray.

4. The system of claim 3, wherein the knurled clamping surfaces of the first and second securement members comprise at least one penetrating member that is configured to penetrate the first and second foot sections to at least substantially prevent the battery frame from being moved vertically within the tray.

5. The system of claim 4, wherein the at least one penetrating member comprises an at least substantially triangular cross-sectional shape.

6. The system of claim 4, wherein the at least one penetrating member comprises at least one elongated rib.

7. The system of claim 6, wherein the knurled surfaces of the first and second securement members comprise a plurality of elongated ribs.

8. The system of claim 1, further comprising:
  a first fastener for coupling the first securement member with the tray; and
  a second fastener for coupling the second securement member with the tray.

9. The system of claim 8, wherein the first and second fasteners comprise at least one of a bolt, a rivet, a screw, a pin, and a hinge.

10. The system of claim 8, wherein the first and second fasteners allow the first and second securement members to pivot with respect to the tray.

11. The system of claim 1, wherein the tray comprises at least one rib that is configured to be aligned with a corresponding slot in the battery frame to facilitate placement of the battery frame in a particular configuration within the tray.

12. A system for receiving and securing a battery within a vehicle, the system comprising:
  a tray configured for receiving a battery frame housing a vehicle battery;
  a securement member coupled with the tray and configured to engage an upper surface of a foot section of a first battery frame, wherein the foot section of the first battery frame has a first height, wherein the securement member is configured to directly engage the upper surface of the foot section of the first battery frame so as to at least substantially prevent the battery frame from moving relative to the tray, wherein the securement member is configured to directly engage an upper surface of a foot section of a second battery frame so as to at least substantially prevent the battery frame from moving relative to the tray, and wherein the foot section of the second battery frame has a second height that differs from the first height.

13. The system of claim 12, wherein the tray comprises at least one rib that is configured to be aligned with a corresponding slot in the battery frame to facilitate placement of the battery frame in a particular configuration within the tray.

14. The system of claim 12, wherein the securement member comprises a knurled surface to at least substantially prevent the battery frame from moving relative to the tray.

15. The system of claim 12, wherein the securement member comprises at least one penetrating member configured to penetrate into the foot section of a first battery frame and the foot section of the second battery frame, wherein the at least one penetrating member is configured to penetrate into the foot section of the first battery frame to a first depth and the at least one penetrating member is configured to penetrate into the foot section of the second battery frame to a second depth, wherein the first depth differs from the second depth.

16. The system of claim 15, wherein the at least one penetrating member comprises an elongated rib.

17. The system of claim 16, wherein the at least one penetrating member comprises a plurality of elongated ribs positioned in an at least substantially parallel manner on the securement member.

18. The system of claim 17, wherein the plurality of elongated ribs are positioned to extend at least substantially parallel to a direction from which the securement member extends from the tray.

19. The system of claim 16, wherein the elongated rib comprises an at least substantially triangular cross-sectional shape.

20. A vehicle battery system, comprising:
  a battery frame housing a vehicle battery, wherein the battery frame comprises opposing first and second foot sections extending laterally from a lower portion of the battery frame, and wherein the first and second foot sections each comprise an upper surface;
  a tray for receiving the battery frame, wherein the tray comprises a recess defined by opposing sidewalls, and wherein the tray is configured such that the first and second foot sections sit within the recess when the battery frame is received in the tray;
  a rib positioned in the tray, wherein the rib is configured to be aligned with a corresponding slot in the battery frame to facilitate placement of the battery frame in a particular configuration within the tray;
  a first securement member coupled with the tray, wherein the first clamp member comprises a plurality of elongated ribs that are configured to penetrate an upper surface of the first foot section, and wherein each of the elongated ribs of the first securement member comprises an at least substantially triangular cross-sectional shape;
  a second securement member coupled with the tray, wherein the second securement member comprises a plurality of elongated ribs that are configured to penetrate an upper surface of the second foot section, wherein each of the elongated ribs of the second securement member comprises an at least substantially triangular cross-sectional shape, wherein the elongated ribs of the first and second securement members are configured to at least substantially prevent the battery frame from moving relative to the tray, and wherein the first and second securement members are configured to accommodate receipt of foot sections of varying heights while still at least substantially preventing the battery frame from being moved vertically within the tray;
  a first fastener for coupling the first securement member with the tray; and
  a second fastener for coupling the second securement member with the tray.

* * * * *